United States Patent
Parks (10) Patent No.: US 7,441,724 B2
(45) Date of Patent: Oct. 28, 2008

(54) SYSTEM AND METHOD FOR CONTROLLING A ROLL RATE OF A TORSIONALLY-DISCONNECTED FREEWING AIRCRAFT

(75) Inventor: Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 11/228,351

(22) Filed: Sep. 19, 2005

(65) Prior Publication Data

US 2006/0065776 A1 Mar. 30, 2006

Related U.S. Application Data

(60) Provisional application No. 60/610,569, filed on Sep. 17, 2004.

(51) Int. Cl.
*B64C 27/22* (2006.01)
*B64C 3/38* (2006.01)
*F42B 10/00* (2006.01)
*F42B 15/01* (2006.01)
*G05D 1/00* (2006.01)

(52) U.S. Cl. .............. 244/7 C; 244/3.28; 244/7 B; 244/39; 244/46; 244/48; 244/195; 244/13; 244/12.1

(58) Field of Classification Search ............... 244/195, 244/48, 39, 46, 7 C, 7 A, 7 B, 6, 12.1, 12.5, 244/13, 17.13, 23 R, 23 C, 23 D, 9, 10, 11, 244/21, 22, 199.4

See application file for complete search history.

(56) References Cited

U.S. PATENT DOCUMENTS

| 1,918,426 A | 7/1933 | Radnor |
| 2,058,678 A | 10/1936 | Fry |
| 2,328,786 A | 9/1943 | Crowder |
| 2,330,622 A | 9/1943 | Ramshorn |
| 2,338,751 A | 1/1944 | Zuck |

(Continued)

OTHER PUBLICATIONS http://en.wikipedia.org/wiki/Inertial_measurement_unit (availaable on the web Nov. 27, 2002).*

(Continued)

*Primary Examiner*—Michael R. Mansen
*Assistant Examiner*—Joshua J Michener
(74) *Attorney, Agent, or Firm*—Katten Muchin Rosenman LLP (57) ABSTRACT

An aircraft includes a fuselage, and first and second freewings. Each of the first and second freewings is separately mounted to the fuselage and independently freely pivotable about respective pivot axes. The aircraft includes an angular rate sensor configured to measure a roll rate of the fuselage and to output a first roll rate signal. The aircraft includes a controller in communication with the angular rate sensor and configured to receive a second roll rate signal from the pilot and to compare the first and second roll rate signals to generate first and second control surface control signals. The aircraft includes at least one control actuator in communication with the controller and configured to actuate a first control surface of the first freewing and a second control surface of the second freewing in response to the first and second control surface control signals, respectively, to control the roll rate of the aircraft.

15 Claims, 3 Drawing Sheets

U.S. PATENT DOCUMENTS

| | | | |
|---|---|---|---|
| 2,347,230 A | 4/1944 | Zuck | |
| 2,397,632 A | 4/1946 | Stuart | |
| 2,410,967 A | 11/1946 | Eaton | |
| 2,417,725 A | 3/1947 | Zuck | |
| 2,444,781 A | 7/1948 | Leonard | |
| D153,331 S | 4/1949 | Zuck | |
| D154,829 S | 4/1949 | Zuck | |
| 2,477,637 A | 8/1949 | Mercier | |
| 2,479,125 A | 8/1949 | Leonard | |
| 2,575,415 A | 11/1951 | Grimac | |
| 2,593,541 A | 4/1952 | Cowdrey et al. | |
| 2,622,826 A | 12/1952 | Prince | |
| 2,670,050 A | 2/1954 | Enos | |
| 2,712,420 A | 7/1955 | Amster et al. | |
| 2,848,180 A | 8/1958 | Ploger | |
| 2,866,608 A | 12/1958 | Leonard | |
| 2,908,472 A | 10/1959 | McDonald | |
| 2,959,373 A | 11/1960 | Zuck | |
| 2,994,493 A | 8/1961 | Hartman | |
| 3,056,564 A | 10/1962 | Zuck | |
| 3,096,952 A | 7/1963 | Roppel | |
| 3,100,377 A | 8/1963 | Kosin et al. | |
| 3,138,351 A | 6/1964 | Zuck | |
| 3,142,455 A | 7/1964 | Wilford | |
| 3,164,222 A | 1/1965 | Conrad | |
| 3,166,271 A | 1/1965 | Zuck | |
| 3,169,728 A | 2/1965 | Langfelder et al. | |
| 3,175,789 A | 3/1965 | Blumrich | |
| 3,179,353 A | 4/1965 | Peterson | |
| 3,258,206 A | 6/1966 | Simonson | |
| 3,350,035 A | 10/1967 | Schlieben | |
| 3,387,805 A | 6/1968 | Barnett et al. | |
| 3,415,469 A | 12/1968 | Spratt | |
| 3,475,913 A | 11/1969 | Mortlock et al. | |
| 3,511,455 A | 5/1970 | Weick | |
| 3,563,496 A | 2/1971 | Zuck | |
| 3,664,463 A | 5/1972 | Kuethe | |
| 3,730,459 A | 5/1973 | Zuck | |
| 3,806,068 A | 4/1974 | Blythe et al. | |
| 3,987,981 A | 10/1976 | Kook | |
| 4,005,835 A | 2/1977 | Gerstine et al. | |
| 4,037,405 A | 7/1977 | Huenniger et al. | |
| 4,045,948 A | 9/1977 | Hannibal | |
| 4,071,207 A | 1/1978 | Piasecki et al. | |
| 4,092,716 A * | 5/1978 | Berg et al. | 701/3 |
| 4,124,180 A | 11/1978 | Wolowicz | |
| 4,155,221 A | 5/1979 | Dhoore et al. | |
| 4,175,385 A | 11/1979 | Nash | |
| 4,214,703 A | 7/1980 | Sorensen et al. | |
| 4,241,876 A | 12/1980 | Pedersen | |
| 4,250,658 A | 2/1981 | Kress | |
| 4,358,074 A | 11/1982 | Schoen et al. | |
| 4,415,132 A * | 11/1983 | Shirk | 244/48 |
| 4,474,534 A | 10/1984 | Thode | |
| 4,519,559 A | 5/1985 | Logan et al. | |
| 4,568,043 A | 2/1986 | Schmittle | |
| 4,575,006 A | 3/1986 | Madden | |
| 4,596,368 A | 6/1986 | Schmittle | |
| 4,630,788 A | 12/1986 | Veaux et al. | |
| 4,634,081 A | 1/1987 | Chee | |
| 4,709,879 A | 12/1987 | Stafford | |
| 4,804,155 A | 2/1989 | Strumbos | |
| 4,821,980 A | 4/1989 | Clausen et al. | |
| 4,875,655 A | 10/1989 | Bender et al. | |
| 4,928,907 A | 5/1990 | Zuck | |
| 4,948,072 A | 8/1990 | Garland et al. | |
| 4,964,599 A * | 10/1990 | Farineau | 244/195 |
| 4,967,984 A | 11/1990 | Allen | |
| 4,978,071 A | 12/1990 | MacLean et al. | |
| 5,000,404 A | 3/1991 | Martorella | |
| 5,028,001 A | 7/1991 | Bender et al. | |
| 5,056,738 A | 10/1991 | Mercer et al. | |
| 5,062,587 A | 11/1991 | Wernicke | |
| 5,067,668 A | 11/1991 | Zuck | |
| 5,086,993 A | 2/1992 | Wainfan | |
| 5,115,996 A | 5/1992 | Moller | |
| 5,116,030 A | 5/1992 | Nowak et al. | |
| 5,176,339 A | 1/1993 | Schmidt | |
| 5,280,863 A | 1/1994 | Schmittle | |
| 5,282,358 A | 2/1994 | Schilling | |
| 5,289,994 A | 3/1994 | Del Campo Aguilera | |
| 5,294,077 A | 3/1994 | Derrien | |
| 5,295,643 A | 3/1994 | Ebbert et al. | |
| 5,340,057 A * | 8/1994 | Schmittle | 244/48 |
| 5,366,180 A | 11/1994 | Wainfan et al. | |
| 5,366,181 A | 11/1994 | Hanson | |
| 5,390,877 A | 2/1995 | Nightingale | |
| 5,395,073 A | 3/1995 | Rutan et al. | |
| 5,509,623 A | 4/1996 | Schmittle | |
| 5,516,060 A | 5/1996 | McDonnell | |
| 5,524,847 A | 6/1996 | Brodell et al. | |
| 5,560,568 A | 10/1996 | Schmittle | |
| 5,666,803 A | 9/1997 | Windisch | |
| 5,687,948 A | 11/1997 | Whiteford et al. | |
| 5,722,615 A * | 3/1998 | Bilange et al. | 244/45 A |
| 5,746,390 A | 5/1998 | Chiapetta | |
| 5,765,777 A | 6/1998 | Schmittle | |
| 5,765,783 A | 6/1998 | Albion | |
| 5,769,359 A | 6/1998 | Rutan et al. | |
| 5,842,687 A | 12/1998 | David | |
| 5,941,478 A | 8/1999 | Schmittle | |
| RE36,487 E | 1/2000 | Wainfain | |
| 6,168,117 B1 * | 1/2001 | Shinagawa | 244/195 |
| 6,170,778 B1 | 1/2001 | Cycon et al. | |
| 6,293,141 B1 | 9/2001 | Nance | |
| 6,318,668 B1 | 11/2001 | Ulanoski et al. | |
| 6,328,259 B1 | 12/2001 | Bolukbasi | |
| 6,336,610 B1 | 1/2002 | Wode | |
| 6,343,768 B1 | 2/2002 | Muldoon | |
| 6,358,014 B1 | 3/2002 | Chou et al. | |
| 6,364,603 B1 | 4/2002 | Czahor et al. | |
| 6,382,556 B1 | 5/2002 | Pham | |
| 6,382,559 B1 | 5/2002 | Sutterfield et al. | |
| 6,471,198 B2 | 10/2002 | Herbst | |
| 6,474,603 B1 | 11/2002 | Kinkead et al. | |
| 6,539,290 B1 * | 3/2003 | Vos | 701/3 |
| 6,543,718 B2 | 4/2003 | Provost | |
| 6,547,180 B1 | 4/2003 | Cassidy | |
| 6,561,455 B2 | 5/2003 | Capanna | |
| 6,568,635 B2 | 5/2003 | Carpenter | |
| 6,592,071 B2 | 7/2003 | Kinkead et al. | |
| 6,751,946 B2 | 6/2004 | Li | |
| 6,783,096 B2 | 8/2004 | Baldwin | |
| 6,808,140 B2 | 10/2004 | Moller | |
| 2003/0052228 A1 * | 3/2003 | Sankrithi | 244/119 |
| 2003/0127569 A1 * | 7/2003 | Bacon et al. | 244/195 |
| 2003/0141418 A1 * | 7/2003 | Darbyshire | 244/195 |
| 2004/0026563 A1 | 2/2004 | Moller | |

OTHER PUBLICATIONS

Athena Controls, GuideStar 111m, http://www.athenati.com/products_services/guidestar/guidestar_gs-111m, pp. 1-2.*

Athena Controls, Guidestar Flies on Goldeye-50, Apr. 26, 2005, http://www.athenati.com/news_events/press_releases/april_26_2005.*

"Freewing Scorpion UAV", http://www.scaled.com/projects/freewing.html, 2 pages.

"International Preliminary Report on Patentability"; PCT/US2005/033000; Jul. 26, 2007; 12 Pages.

Chuck Wilkins; "Team GoldenEye Selected for Phase II of DARPA OAV-II Program"; Arora Flight Sciences Corp. Press release, APR-165; Jul. 13, 2004; 1 Page.

Chuck Wilkins; "Team GoldenEye to Develop Organic Air Vehicle for DARPA"; Aurora Flight Sciences Press Release, APR-158; Dec. 7, 2004; 2 Pages.

Notification of Transmittal of the International Search Report and the Written Opinion, the International Search Report, and the Written Opinion for International Application No. PCT/US05/33233, mailed Dec. 14, 2006.

GoldenEye-50 Transition Images. Apr. 26, 2005; further depicts GoldenEye-50 as disclosed in Garamone; http://www.aurora.aero/GE50/images/GE-transition.jpg: ; 2 pages.

Notification of Transmittal of the International Search Report and the Written Opinion, The International Search Report, and the Written Opinion for International Application No. PCT/US05/33000; mailed Jun. 28, 2007; 15 pages.

Dr. Edward T. Smith; "Near-Term Demonstrations of GoldenEye-50 UAV with Options for Advanced Features"; Aurora Flight Sciences Corp.; Jun. 30, 2004; 5 pages.

"GoldenEye-50: A Proposal to Lockheed Martin; Aurora Proposal No. AP04-026"; Aurora Flight Sciences Corp.; Jun. 4, 2004; 12 pages.

Greg Slabodkin; "GoldenEye-100 UAV Successfully Completes Initial Flight Test Program"; Aurora Flight Sciences Corp. Press Release, APR-153; Apr. 7, 2004, 1 page, www.aurora.aero.☐.

Dr. Edward T. Smith; "Feb. 12, 2004 Demonstration Summary: Reference to Proposal No. AP04-018"; Aurora Flight Sciences Corp.; Feb. 23, 2004; 5 pages.

"DARPA Heterogeneous Urban RSTA Team (HURT) Program: A Proposal in Response to Raytheon RFP REB012404.01; Aurora Proposal No. AP04-014"; Aurora Flight Sciences Corp.; Feb. 6, 2004; 19 pages.

"An Advanced Low-Observable UAV System For Remote Sensor Deployment: Aurora Proposal No. AP04-001"; Aurora Flight Sciences Corp.; Jan. 15, 2004; 21 pages.

Greg Slabodkin; "Aurora Announces Plans for GoldenEye-50 Unmanned Aerial Vehicle: VTOL Design Provides Versatile Tool for Homeland Security Applications"; Aurora Flight Sciences Corp. Press Release, APR-150; Dec. 4, 2003; 2 pages; www.aurora.aero.

"2nd AIAA Unmanned Unlimited Systems, Technologies, and Operations—Aerospace, Land, and Sea Conference and Workshop & Exhibit: Event Agenda"; AIAA—American Institute of Aeronautics and Astronautics; Sep. 16, 2003; 6 pages; http://www.aiaa.org/agenda.cfm?lumeetingid=834&viewcon=agenda&pageview=2&programSeeview=1&dateget=16-Sep-03.html.

Carl G. Schaefer, Jr., et al.; "GoldenEye: The Clandestine UAV"; American Institute of Aeronautics and Astronautics; Sep. 16, 2003; 11 pages.

Dr. Edward T. White; "Golden Eye's First Flight Successful: Aurora Demonstrates Potential for a New Breed of Unmanned Aircraft"; Aurora Flight Sciences Corp. Press Release, APR-148; Sep. 8, 2003, 8 pages (with photos downloaded from website); http://aurora_aero/news/apr-148.html.

Jim Garamone; "UAVs Demonstrate the Future at Pax River Event"; American Forces Information Service News Articles, United States Department of Defense; Jul. 14, 2003; 7 pages (with photos downloaded from website); http://www.defenselink.mil/news/Jul2003/n07142003_200307144.html.

"GoldenEye-50 System Information Sheet"; Aurora Flight Sciences Corp.; Jul. 2003; 2 pages.

http://en.wikipedia.org/wiki/Attitude_indicator; available on the web Jul. 30, 2004; 1 page.

http://www.tpub.com/content/aviation/14030/css/14030_205.htm; available on the web Sep. 26, 2003; 1 page.

http://www.grc.nasa.gov/WWW/K-12/airplane/pitot.html; available on the web May 22, 2000; 3 pages.

GoldenEye-50 Transition Images. Aurora Flight Sciences. http://www.aurora.aero/GE50/images/GE-transition.jpg; Nov. 28, 2006; 2 pages☐.

"GoldenEye's First Flight Successful." Aurora Flight Sciences Press Release, Jul. 16, 2003, with linked images. http://www.aurora.aero/news/APR-148.html; 9 pages☐.

Notification of Transmittal of the International Search Report and the Written Opinion of the International Searching Authority or Declaration for International Application No. PCT/US05/33234; mailed Feb. 29, 2008; 11 pages.

"International Preliminary Report on Patentability"; PCT/US2005/033235; Dec. 21, 2007; 2 pages.

International Search Report & Written Opinion dated Nov. 19, 2007, issued in PCT/US05/33235 (10 pages).

NASA, Pitot-Static Tube, http://www.grc.nasa.gov/WWW/K-12/airplane/pitot.html.

http://en.wikipedia.org/wiki/Moment_of_inertia; available on the web Feb. 19, 2008; 8 pages.

Chuck Wilkins; "GoldenEye-50 UAV Makes First Autonomous Transition Flights"; Aurora Flight Sciences Corp. Press Release, APR-162; Apr. 26, 2005; 2 pages.

Notification of Transmittal of the International Search Report and the Written Opinion of the International Searching Authority or Declaration for International Application No. PCT/US05/33232; mailed Apr. 17, 2008; 8 pages.

T. M. Harris et al.; "Theoretical Investigation of Torsion Free Wing Flutter Models"; Air Force Flight Dynamics Laboratory Director of Science & Technology Air Force Systems Command; AFFDL-TM-76-93-FBR; Aug. 1976; 72 Pages.

W. M. Moseley, Jr. et al.; "Stress and Weight Analysis of a Torsionally Free Wing System"; General Dynamics-Convair Aerospace Division; ERR-FW-1446; Jul. 15, 1973; 57 Pages.

W. J. Moran; "ATF/TFW Feasibility Study—Performance Analyses"; General Dynamics-Convair Aerospace Division; ERR-FW-1459; Dec. 31, 1973; 19 Pages.

I. C. Bhateley; "An Investigation of the Interference Effects Between Fuselage and Wing at High Relative Incidence"; General Dynamics-Convair Aerospace Division; ERR-FW-1464; Dec. 31, 1973; 70 Pages.

G. T. Joyce; "The Stability and Control Characteristics of a Torsion Free Wing Advanced Tactical Fighter"; General Dynamics-Convair Aerospace Division; ERR-FW-1451; Dec. 31, 1973; 50 Pages.

Notification of Transmittal of the International Search Report and the Written Opinion, the International Search Report, and the Written Opinion for International Application No. PCT/US05/33231; mailed Aug. 8, 2007; 8 pages.

"International Preliminary Report on Patentability"; PCT/US2005/033231; Sep. 20, 2007; 2 Pages.

* cited by examiner

SYSTEM AND METHOD FOR CONTROLLING A ROLL RATE OF A TORSIONALLY-DISCONNECTED FREEWING AIRCRAFT

This application claims priority under 35 U.S.C. § 119(e) to U.S. Provisional Application No. 60/610,569, filed on Sep. 17, 2004, the entire contents of which are hereby incorporated by reference herein.

BACKGROUND

1. Field of the Invention

The present invention relates to freewing aircraft. More particularly, the present invention relates to a system and method for controlling a roll rate of a torsionally-disconnected freewing aircraft.

2. Background Information

Some conventional aircraft employ wings that are free to rotate about a spanwise axis, commonly called "freewings." Freewings are described in, for example, U.S. Reissue Pat. No. RE36,487 to Wainfain, U.S. Pat. No. 5,340,057 to Schmittle, and U.S. Pat. No. 5,395,073 to Rutan et al. The use of freewings has numerous advantages over more conventional designs. A common feature of freewing designs is the use of a tube connecting the left wing to the right wing. The tube generally serves as the pivot axis. The tube must have significant torsional stiffness to keep the two wings at the same angle relative to the body.

There have been attempts at modifying the design by eliminating the tube. Such a modification has the advantage of reducing the weight and also allowing better use of the fuselage volume. However, such modifications have been discarded as unworkable due to significant stability problems. For example, in one early attempt at uncoupled freewing design, an aircraft that was built with such uncoupled wings crashed on its first takeoff attempt. The stability problems result from the fact that torsionally disconnected freewings will cause divergent behavior of the aircraft, both to external disturbances and also to minor misalignments of the aircraft itself. The problem is so severe that misalignments that are insignificant on conventional aircraft can result in uncontrolled rolling at many revolutions per second with the torsionally-disconnected freewing.

Therefore, there is a need for a control system for torsionally disconnected freewings that can make the use of such freewings safe and practical.

SUMMARY OF THE INVENTION

A system and method are disclosed for controlling the roll rate of a torsionally-disconnected freewing aircraft. In accordance with exemplary embodiments of the present invention, according to a first aspect of the present invention, an aircraft includes a fuselage, a first freewing and a second freewing. Each of the first and second freewings is separately mounted to the fuselage and independently freely pivotable about respective pivot axes. The aircraft includes an angular rate sensor. The angular rate sensor is configured to measure a roll rate of the fuselage and to output a first roll rate signal. The aircraft includes a controller in communication with the angular rate sensor. The controller is configured to receive a second roll rate signal from a pilot of the aircraft. The controller is configured to compare the first and second roll rate signals to generate first and second control surface control signals. The aircraft includes at least one control actuator in communication with the controller. The at least one control actuator is configured to actuate a first control surface of the first freewing and a second control surface of the second freewing in response to the first and second control surface control signals, respectively, to control a roll rate of the aircraft.

According to the first aspect, the angular rate sensor can include an angular rate gyroscope or the like. Each of the first and second control surfaces can include an airfoil on a respective trailing edge of each of the first and second freewings. The aircraft can include an airspeed sensor in communication with the controller. The airspeed sensor can be configured to measure an airspeed of the aircraft. The controller can be configured to modify the first and second control surface control signals in accordance with the airspeed of the aircraft. Each of the first and second freewings can include a principal inertial axis, a tip and a base. According to an exemplary embodiment of the first aspect, the principal inertial axis of each of the first and second freewings can be substantially aligned fore of the respective pivot axis at the tip of each of the first and second freewings, and substantially aligned aft of the respective pivot axis at the base of each of the first and second freewings. According to an alternative exemplary embodiment of the first aspect, the principal inertial axis of each of the first and second freewings can be substantially aligned with the respective pivot axis of each of the first and second freewings. The respective pivot axes of the first and second freewings can comprise lateral axes of the fuselage.

According to a second aspect of the present invention, a system for controlling a roll rate of an aircraft includes a roll rate sensor configured to measure a roll rate of a fuselage of the aircraft and to output a first roll rate signal. The aircraft includes separately coupled first and second freewings, independently freely pivotable about respective pivot axes, to the fuselage. The system includes a control processor in communication with the roll rate sensor. The control processor is configured to receive a second roll rate signal from a pilot of the aircraft. The control processor is configured to compare the first and second roll rate signals to generate first and second control signals. The system includes a control actuator in communication with the control processor. The control actuator is configured to actuate a first control member of the first freewing and a second control member of the second freewing in response to the first and second control signals, respectively, to control the roll rate of the aircraft.

According to the second aspect, the roll rate sensor can include an angular rate gyroscope or the like. Each of the first and second control members can include an airfoil on a respective trailing edge of each of the first and second freewings. The system can include a dynamic pressure sensor in communication with the control processor. The dynamic pressure sensor can be configured to measure an airspeed of the aircraft. The control processor can be configured to modify the first and second control signals in accordance with the airspeed of the aircraft. Each of the first and second freewings can include a principal inertial axis, a tip and a base. According to an exemplary embodiment of the second aspect, the principal inertial axis of each of the first and second freewings can be substantially aligned fore of a respective pivot axis at the tip of each of the first and second freewings, and substantially aligned aft of the respective pivot axis at the base of each of the first and second freewings. According to an alternative exemplary embodiment of the second aspect, the principal inertial axis of each of the first and second freewings can be substantially aligned with the respective pivot axis of each of the first and second freewings. The respective pivot axes of the first and second freewings can comprise lateral axes of the fuselage.

According to a third aspect of the present invention, an aircraft includes a fuselage, a first freewing and a second freewing. Each of the first and second freewings is separately mounted to the fuselage and independently freely pivotable about respective pivot axes. The aircraft includes a sensor means for measuring a roll rate of the fuselage and for outputting a first roll rate signal. The aircraft includes means for controlling control surfaces of the aircraft. The controlling means is in communication with the sensor means and configured to receive a second roll rate signal from a pilot of the aircraft. The controlling means is configured to compare the first and second roll rate signals to generate first and second control surface control signals. The aircraft includes at least one actuator means in communication with the controlling means for actuating a first control surface of the first freewing and a second control surface of the second freewing in response to the first and second control surface control signals, respectively, to control a roll rate of the aircraft.

According to the third aspect, the sensor means includes an angular rate gyroscopic sensor means or the like. Each of the first and second control surfaces can include an airfoil means on a respective trailing edge of each of the first and second freewings. The aircraft can include an airspeed sensor means in communication with the controlling means for measuring an airspeed of the aircraft. The controlling means can be configured to modify the first and second control surface control signals in accordance with the airspeed of the aircraft. Each of the first and second freewings can include a principal inertial axis, a tip and a base. According to an exemplary embodiment of the present invention, the principal inertial axis of each of the first and second freewings can be substantially aligned fore of the respective pivot axis at the tip of each of the first and second freewings, and substantially aligned aft of the respective pivot axis at the base of each of the first and second freewings. According to an alternative exemplary embodiment, the principal inertial axis of each of the first and second freewings can be substantially aligned with the respective pivot axis of each of the first and second freewings. The respective pivot axes of the first and second freewings can comprise lateral axes of the fuselage.

According to a fourth aspect of the present invention, a system for controlling a roll rate of an aircraft includes a sensor means for measuring a roll rate of a fuselage of the aircraft and for outputting a first roll rate signal. The aircraft includes separately coupled first and second freewings, independently freely pivotable about respective pivot axes, to the fuselage. The system includes means for controlling control surfaces of the aircraft. The controlling means is in communication with the sensor means and configured to receive a second roll rate signal from a pilot of the aircraft. The controlling means is configured to compare the first and second roll rate signals to generate first and second control signals. The system includes an actuator means in communication with the controlling means for actuating a first control member of the first freewing and a second control member of the second freewing in response to the first and second control signals, respectively, to control the roll rate of the aircraft.

According to the fourth aspect, the sensor means can include an angular rate gyroscopic sensor means. Each of the first and second control members can include an airfoil means on a respective trailing edge of each of the first and second freewings. The system can include a dynamic pressure sensor means in communication with the controlling means for measuring an airspeed of the aircraft. The controlling means can be configured to modify the first and second control signals in accordance with the airspeed of the aircraft. Each of the first and second freewings can include a principal inertial axis, a tip and a base. According to an exemplary embodiment of the fourth aspect, the principal inertial axis of each of the first and second freewings can be substantially aligned fore of a respective pivot axis at the tip of each of the first and second freewings, and substantially aligned aft of the respective pivot axis at the base of each of the first and second freewings. According to an alternative exemplary embodiment of the fourth aspect, the principal inertial axis of each of the first and second freewings can be substantially aligned with a respective pivot axis of each of the first and second freewings. The respective pivot axes of the first and second freewings can comprise lateral axes of the fuselage.

According to fifth aspect of the present invention, a method of controlling a roll rate of an aircraft includes the steps of: a.) measuring a roll rate of a fuselage of the aircraft to generate a first roll rate signal, wherein the aircraft includes first and second freewings, independently freely pivotable about respective pivot axes, separately coupled to the fuselage; b.) receiving a second roll rate signal from a pilot of the aircraft; c.) comparing the first and second roll rate signals to generate first and second control signals; and d.) actuating a first control surface of the first freewing and a second control surface of the second freewing in response to the first and second control signals, respectively, to control the roll rate of the aircraft.

According to the fifth aspect, each of the first and second control surfaces can include an airfoil on a respective trailing edge of each of the first and second freewings. Step (a) can be performed along a fore-aft axis of the fuselage. The method can include the steps of: e.) measuring an airspeed of the aircraft; and f.) modifying the first and second control signals in accordance with the airspeed of the aircraft. Each of the first and second freewings can include a principal inertial axis, a tip and a base. According to an exemplary embodiment of the fifth aspect, the principal inertial axis of each of the first and second freewings can be substantially aligned fore of a respective pivot axis at the tip of each of the first and second freewings, and substantially aligned aft of the respective pivot axis at the base of each of the first and second freewings. According to an alternative exemplary embodiment of the fifth aspect, the principal inertial axis of each of the first and second freewings can be substantially aligned with a respective pivot axis of each of the first and second freewings. The respective pivot axes of the first and second freewings can comprise lateral axes of the fuselage.

According to a sixth aspect of the present invention, a computer program for controlling a roll rate of an aircraft performs the steps of: a.) receiving a first roll rate signal comprising a measurement of a roll rate of a fuselage of the aircraft, wherein the aircraft includes first and second freewings, independently freely pivotable about respective pivot axes, separately coupled to the fuselage; b.) receiving a second roll rate signal from a pilot of the aircraft; c.) comparing the first and second roll rate signals; and d.) generating first and second control signals for actuating a first control member of the first freewing and a second control member of the second freewing, respectively, to control the roll rate of the aircraft.

According to the sixth aspect, each of the first and second control members can include an airfoil on a respective trailing edge of each of the first and second freewings. The computer program can perform the steps of: e.) receiving a measurement of an airspeed of the aircraft; and f.) modifying the first and second control signals in accordance with the airspeed of the aircraft. Each of the first and second freewings can include a principal inertial axis, a tip and a base. According to an exemplary embodiment of the sixth aspect, the principal inertial axis of each of the first and second freewings can be substantially aligned fore of a respective pivot axis at the tip of each of the first and second freewings, and substantially aligned aft of the respective pivot axis at the base of each of the first and second freewings. According to an alternative exemplary embodiment of the sixth aspect, the principal inertial axis of each of the first and second freewings can be substantially aligned with a respective pivot axis of each of the first and second freewings. The respective pivot axes of the first and second freewings can comprise lateral axes of the fuselage. The computer program can be stored on a computer-readable medium.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for controlling the roll rate of a torsionally-disconnected freewing aircraft, such as, for example, a vertical take-off and landing (VTOL) ducted fan aircraft or the like. According to exemplary embodiments, a feedback control system can be used to stabilize the torsionally-disconnected freewings against internal asymmetries. An angular rate gyroscope can be mounted in the main body or fuselage of the aircraft, with its sensitive axis aligned to the fore-aft axis of the body. The roll rate signal generated by the angular rate gyroscope can be fed into the control system. The control system can compare the generated roll rate signal to the roll rate commanded by the pilot. The resulting error signal can be fed to small "aileron" control surfaces located on the trailing edge of each freewing. A deflection of the aileron can produce a pitching moment on the freewing panel about its pivot axis, and, consequently, the whole panel can rotate slightly in a direction opposite to the rotation of the aileron. Such movement can change the lift on the two torsionally-disconnected freewings, and can result in a rolling moment and thus an appropriate roll. The angular rate gyroscope can detect the roll and can feed it back into the control system. The result is a roll rate equal to that commanded by the pilot. In addition, the control system can measure the airspeed or dynamic pressure, and adjust the feedback gains accordingly to achieve a freewing control system that is stable and well damped over the entire flight envelope.

According to an additional exemplary embodiment of the present invention, the principal inertial axes of the individual freewings can include an appropriate alignment. Conventionally, freewings have been mass-balanced to locate the wing center of mass along the axis of the pivot. Such an alignment is an adequate condition for a coupled freewing. However, for uncoupled freewings according to exemplary embodiments, the principal inertial axis of each freewing can be located along the pivot axis. Alternatively, each freewing can be swept in front of the pivot axis as the freewing extends outward from the body to the tip. If an aircraft with torsionally-disconnected freewings according to exemplary embodiments encounters a disturbance that causes the aircraft to roll about its fore-aft axis, the result can be a roll acceleration applied to the freewing. The amount of the acceleration can be greater at the tip of the wing than at the root or base.

Thus, according to exemplary embodiments, if the freewing principal axis is ahead of the pivot axis at the tip for each freewing, and behind the pivot axis at the root, the initial disturbance can create a pitch moment in the freewing such that the resulting angle changes can oppose the initial disturbance, and the aircraft can be stable in that mode. Alternatively, if the freewing principal axes are aligned with the pivot axis, there is little or no roll acceleration coupling and the system can be neutrally stable against outside disturbances.

Consequently, exemplary embodiments of the present invention can provide lighter weight and better use of the fuselage volume due to the elimination of the torsional connection tube between the freewings. Conventional freewing aircraft can be substantially stable in gusts that would generally produce a pitch response in an aircraft. Exemplary embodiments provide additional stability with respect to gusts that would produce a rolling motion in conventional freewing aircraft, providing an improved ride and additional stability for, for example, instruments on the aircraft. Exemplary embodiments can additionally achieve substantially high roll rates in forward flight.

Figure 1:
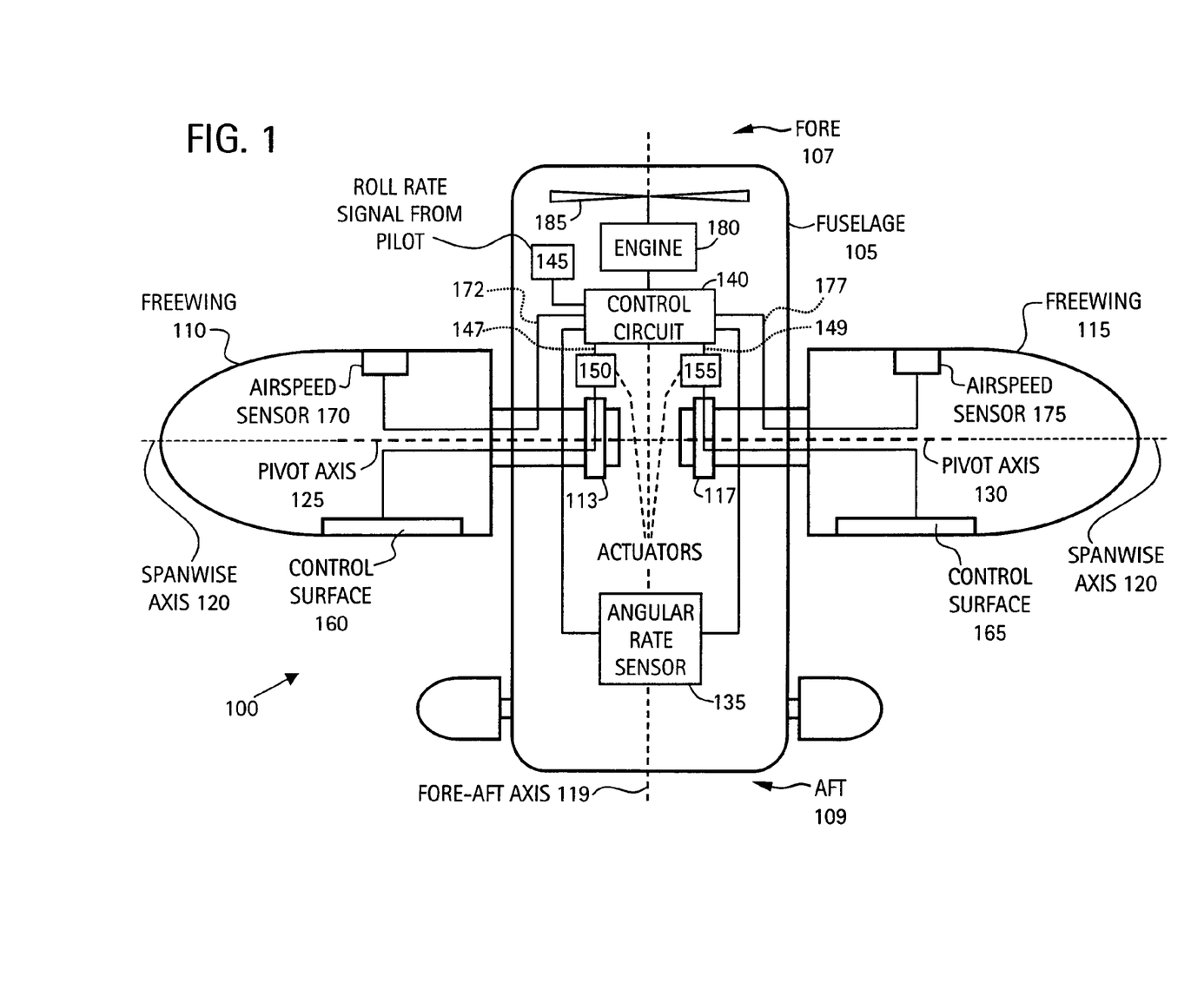
FIG. 1 is a diagram illustrating a system for controlling the roll rate of a torsionally-disconnected freewing aircraft, in accordance with an exemplary embodiment of the present invention.

These and other aspects of the present invention will now be described in greater detail. FIG. 1 is a diagram illustrating a system for controlling the roll rate of a torsionally-disconnected freewing aircraft 100, in accordance with an exemplary embodiment of the present invention. As used herein, "freewings" are wings that are configured to freely rotate about the spanwise or wingspan axis of the aircraft 100. Additionally, as used herein, "torsionally-disconnected freewings" are freewings that do not use a tube connecting one freewing to the other through the body or fuselage the aircraft 100, thereby decoupling the freewings from each other.

The aircraft 100 includes a body or fuselage 105 with a fore 107 and an aft 109. The aircraft 100 includes a first freewing 110 and a second freewing 115, such as left and right freewings, respectively, with respect to a fore-aft axis 119 of the aircraft 100. According to exemplary embodiments, each of the first and second freewings 110 and 115 is configured to be separately mounted to the fuselage 105 of the aircraft 100, for example, along a spanwise axis 120. Additionally, each of the first and second freewings 110 and 115 is configured to be independently freely pivotable about respective pivot axes, such as a first pivot axis 125 with respect to the first freewing 110 and a second pivot axis 130 with respect to the second freewing 115. Each of the first and second freewings 110 and 115 can be mounted at or to the fuselage 105 at any suitable location of the fuselage 105. Additionally, the first and second freewings 110 and 115 can be mounted to the fuselage 105 using any suitable type of mount, such as, for example, first and second pivot mounts 113 and 117. According to an alternative exemplary embodiment, the first and second pivot mounts 113 and 117 can comprise any suitable type of gear or linkage mechanism that can be configured to independently rotate or otherwise pivot each of the first and second freewings 110 and 115 mechanically upon appropriate activation.

The aircraft 100 includes a roll rate or angular rate sensor 135. According to exemplary embodiments, the angular rate sensor 135 is configured to measure the roll rate of the fuselage 105 and to output a first roll rate signal. For example, the angular rate sensor 135 can comprise any suitable type of angular rate gyroscope or any other appropriate type of device capable of measuring the roll rate of the aircraft 100.

The aircraft 100 includes a controller, control processor or other suitable type of control circuit 140 in communication with the angular rate sensor 135. The control circuit 140 is configured to receive a second roll rate signal 145 from the pilot of the aircraft 100 (e.g., from within a cockpit of the aircraft 100 or from a remote control of the aircraft 100). According to exemplary embodiments, the control circuit 140 is configured to compare the first roll rate signal from the angular rate sensor 135 and the second roll rate signal 145 from the pilot to generate first and second control surface controls signals 147 and 149, respectively.

The aircraft 100 includes one or more servo mechanisms or control actuators in communication with the control circuit 140. For example, the aircraft 100 can include a first control actuator 150 and a second control actuator 155, although a single control actuator can be used for each of the first and second freewings 110 and 115. The first control actuator 150 is in communication with a first aileron, airfoil or other suitable type of control surface 160. The first control surface 160 can be located on or along, for example, the trailing (e.g., aft) edge or surface of the first freewing 110. The second control actuator 155 is in communication with a second aileron, airfoil or other suitable type of control surface 165. The second control surface 165 can be located on or along, for example, the trailing (e.g., aft) edge or surface of the second freewing 115. According to exemplary embodiments, the first and second control actuators 150 and 155 are configured to actuate the first and second control surfaces 160 and 165 in response to the first and second control surface control signals 147 and 149, respectively, to control the roll rate of the aircraft 100.

More particularly, according to exemplary embodiments, the first roll rate signal generated by the angular rate sensor 135 can be fed into or otherwise communicated to the control circuit 140. The control circuit 140 can compare the first roll rate signal from the angular rate sensor 135 to the second roll rate signal 145 from the pilot (e.g., subtracting one value from the other). The resulting difference or error signal(s) can be fed or communicated to the first and second control actuators 150 and 155 to cause a suitable deflection of the first and second control surfaces 160 and 165 located on the trailing edges of each of the first and second freewings 110 and 115. A deflection of the first and second control surfaces 160 and 165 can produce a pitching moment on the first and second freewings 110 and 115, respectively, about their respective first and second pivot axes 125 and 130. For the exemplary embodiment illustrated in FIG. 1, the first and second pivot axes 125 and 130 can comprise, for example, lateral axes of the fuselage 105. Consequently, the first and second freewings 110 and 115 can rotate slightly in a direction opposite to the rotation of the first and second control surfaces 160 and 165. Such movement can change the lift on the first and second freewings 110 and 115, and can result in a rolling moment and, thus, an appropriate roll.

For example, if the second roll rate signal 145 from the pilot is greater than the first roll rate signal measured by the angular rate sensor 135, the control circuit 140 can generate positive first and second control surface control signals 147 and 149. Such positive first and second control surface control signals 147 and 149 can cause the first and second control actuators 150 and 155 to increase the deflection of the first and second control surfaces 160 and 165, respectively, in a direction opposite to that of the desired rotation to increase the rotational moment of the fuselage 105 in the direction desired by the pilot. Alternatively, if the second roll rate signal 145 from the pilot is less than the first roll rate signal measured by the angular rate sensor 135, the control circuit 140 can generate negative first and second control surface control signals 147 and 149. Such negative first and second control surface control signals 147 and 149 can cause the first and second control actuators 150 and 155 to decrease the deflection of the first and second control surfaces 160 and 165, respectively, or to otherwise deflect the control surfaces in a direction similar to that of the desired rotation, to decrease and change the rotational moment of the fuselage 105 in the direction desired by the pilot.

According to exemplary embodiments, the detection, feedback and comparison of the roll rate signals continues so that the roll rate of the aircraft 100 can substantially match or otherwise equal the roll rate desired by the pilot (e.g., until the first and second control surface control signals 147 and 149 are zero or substantially zero). The first and second control surface control signals 147 and 149 can be similar or different values or signals to control the deflection of the control surfaces 160 and 165 independently, depending on such factors as, for example, the amount of deflection caused by each of the first and second control surfaces 160 and 165, the amount of desired roll, and other like factors.

The aircraft 100 can also include one or more dynamic pressure or airspeed sensors in communication with the control circuit 140 and configured to measure the dynamic pressure or airspeed of the aircraft 100. For example, the aircraft 100 can include a first airspeed sensor 170 located on or in the first freewing 110, and a second airspeed sensor 175 located on or in the second freewing 115, although a single airspeed sensor can be located at any suitable location in or on the fuselage 105 or either freewing of the aircraft 100. According to exemplary embodiments, the first and second airspeed sensors 170 and 175 are configured to supply first and second airspeed signals 172 and 177 to the control circuit 140. The control circuit 140 is configured to appropriately modify the first and second control surface control signals 147 and 149, respectively, in accordance with the airspeed of the aircraft 100, as supplied by first and second airspeed signals 172 and 177.

For example, for greater airspeeds, the first and second control surfaces 160 and 165 can be deflected by lesser amounts to create the desired roll rate or rotational moment than the amount of deflection required at lesser airspeeds. In other words, as the airspeed of the aircraft 100 increases, the control circuit 140 can decrease the magnitude of the deflection of the first and second control surfaces 160 and 165 by appropriately decreasing the first and second control surface control signals 147 and 149 to achieve the desired roll rate given the (increasing) airspeed. Alternatively, as the airspeed of the aircraft 100 decreases, the control circuit 140 can increase the magnitude of the deflection of the first and second control surfaces 160 and 165 by appropriately increasing the first and second control surface control signals 147 and 149 to achieve the desired roll rate given the (decreasing) airspeed.

For example, the control circuit 140 can maintain a look-up table or other suitable algorithm that stores or otherwise calculates the appropriate deflection of the first and second control surfaces 160 and 165 by cross-referencing the airspeed of the aircraft with, for example, the difference between the first and second roll rate signals to retrieve or otherwise produce the suitable first and second control surface control signals 147 and 149. The values stored in such a look-up table or calculated by the appropriate algorithm will depend on such factors as, for example, the size and weight of the aircraft 100, the speeds at which the aircraft 100 is capable of flying, the size, configuration and orientation of the first and second freewings 110 and 115 and the corresponding first and second control surfaces 160 and 165, and other like factors. The control circuit 140 is configured to appropriately adjust the deflection of the first and second control surfaces 160 and 165 to suitably control the roll rate or rotational moment of the aircraft 100 so that the first and second freewings 110 and 115 are stable and well damped over substantially the entire flight envelope of the aircraft 100.

According to exemplary embodiments, the aircraft 100 can be any suitable type of aircraft that can be configured to use torsionally-disconnected freewings, such as, for example, a VTOL ducted fan aircraft or the like. For example, the aircraft 100 can include any suitable type of ducted fan engine 180 that is configured to drive a propeller or fan rotor 185 within the ducted fan to propel the aircraft 100.

The angular rate sensor 135, the control circuit 140, and the first and second control actuators 150 and 155 can be located at any suitable location within or on the fuselage of the aircraft 100. The first and second control actuators 150 and 155 can comprise any suitable type of electrical, electronic or mechanical device capable of actuating the respective control surfaces. The first and second airspeed sensors 170 and 175 can be any suitable type of electrical, electronic or mechanical device that is capable of measuring the airspeed or dynamic pressure of the aircraft 100. The control circuit 130 can be any suitable type of electrical or electronic device capable of comparing roll rate signals and outputting control surface control signals, appropriately modified in accordance with the measured airspeed or dynamic pressure of the aircraft 100. For example, the control circuit 130 can be comprised of hardware, software, firmware or any suitable combination thereof. The control circuit 140 can be in electrical communication with the angular rate sensor 135, the first and second control actuators 150 and 155, and the first and second airspeed sensors 170 and 175 using any suitable type of electrical connection that is capable of communicating electrical signals.

Alternatively, the control circuit 140 can be comprised of any suitable type of processor, including any type of microprocessor, microcontroller, digital signal processor (DSP), application-specific integrated circuit (ASIC), programmable read- only memory (PROM), erasable programmable read-only memory (EPROM), electrically-erasable programmable read-only memory (EEPROM), or the like. The control circuit 140 can be connected to or include a memory, such as, for example, any type of computer memory or any other type of electronic storage medium, such as, for example, read-only memory (ROM), random access memory (RAM), cache memory, compact disc read-only memory (CDROM), electro-optical memory, magneto-optical memory, or the like. The processor and memory can be used, for example, to perform some or all of the functions of the control circuit 140 described herein. As will be appreciated based on the foregoing description, the memory can be programmed using conventional techniques known to those having ordinary skill in the art of computer programming. For example, the actual source code or object code of the computer program can be stored in the memory.

As discussed previously, conventional (coupled) freewings are mass-balanced to locate the wing center of mass along the axis of the pivot. According to exemplary embodiments, however, the principal inertial axis of each freewing can be located along the pivot axis. If an aircraft with torsionally-disconnected freewings according to exemplary embodiments encounters a disturbance that causes the aircraft 100 to roll about its fore-aft axis 119, the result can be a roll acceleration applied to either or both of the first and second freewings 110 and 115. The amount of the acceleration can be greater at the tip of the freewing than at the root or base. As illustrated in FIG. 1, the principal inertial axes of each of the first and second freewings 110 and 115 (e.g., along spanwise axis 120) can be aligned with the respective pivot axes 125 and 130. In such an exemplary embodiment, there can be little or no roll acceleration coupling, and the system can be neutrally stable against outside disturbances in such an configuration.

Figure 2:
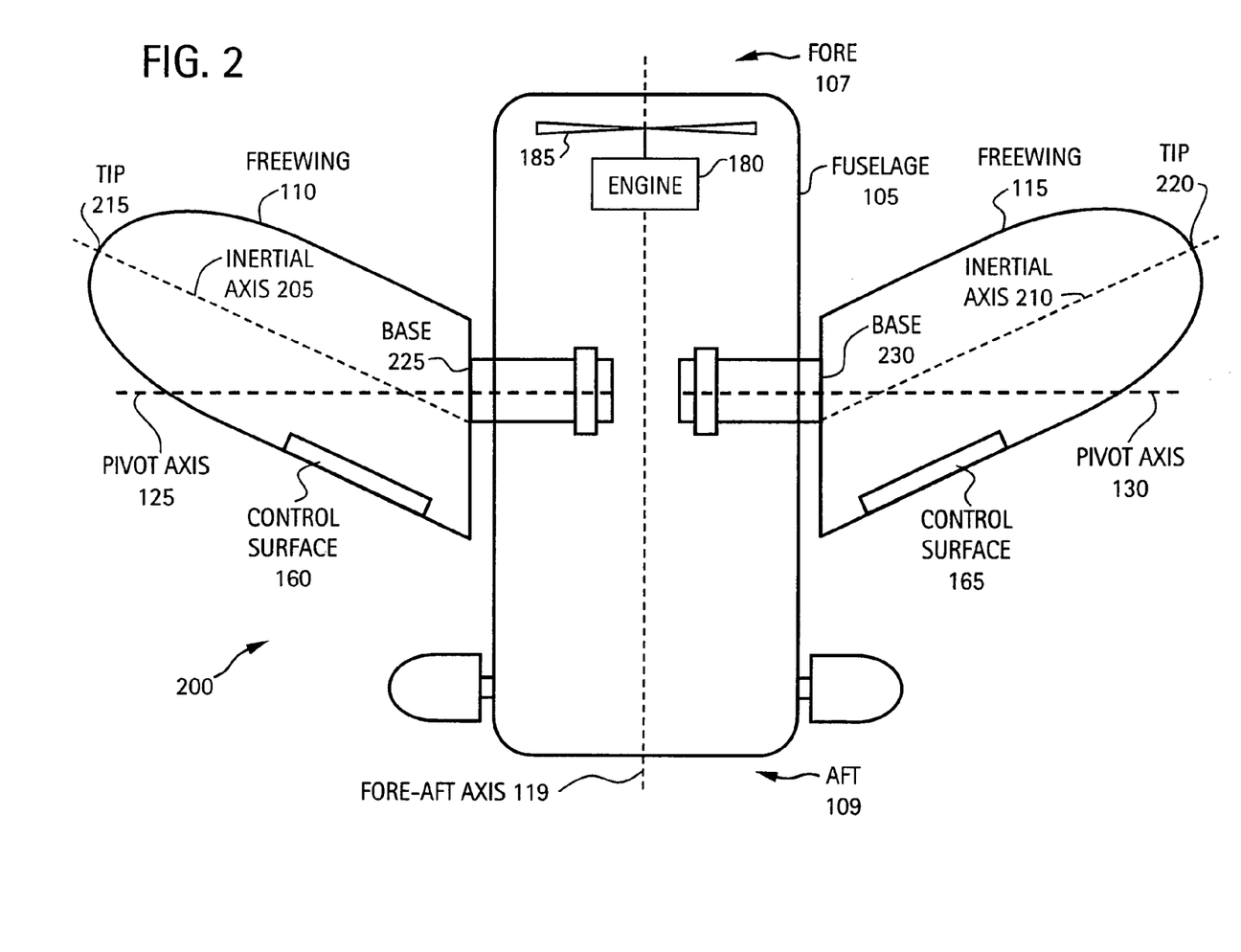
FIG. 2 is a diagram illustrating a system for controlling the roll rate of a torsionally-disconnected freewing aircraft, in accordance with an alternative exemplary embodiment of the present invention.

Alternatively, each freewing can be swept in front of the respective pivot axis as the freewing extends outward from the fuselage 105 to the tip of the freewing. FIG. 2 is a diagram illustrating a system for controlling the roll rate of a torsionally-disconnected freewing aircraft 200, in accordance with an alternative exemplary embodiment of the present invention. It is to be noted that various internal components and connections illustrated in FIG. 1 have not been illustrated in FIG. 2 merely for purposes of clarity for the following discussion.

As illustrated in FIG. 2, each of the first and second freewings 110 and 115 can include a respective principal inertial axis 205 and 210. Each of the first and second freewings 110 and 115 can also include a respective tip 215 and 220. Each of the first and second freewings 110 and 115 can further include a respective base 225 and 230. According to the alternative exemplary embodiment, each principal inertial axis 205 and 210 of each of the first and second freewings 110 and 115 is substantially aligned fore of the respective pivot axes 125 and 130 at the respective tip 215 and 220 of the first and second freewings 110 and 115. Each principal inertial axis 205 and 210 of each of the first and second freewings 110 and 115 is also substantially aligned aft of the respective pivot axis 125 and 130 at the base 225 and 230 of each of the first and second freewings 110 and 115. In other words, each of the first and second freewings 110 and 115 comprises a sweep configuration that extends fore of the respective pivot axes as the freewing extends outward from the fuselage 105 to the tip of the freewing. Accordingly, if the freewing principal inertial axis 201, 210 is ahead of the pivot axis 125, 130 at the tip for each freewing, and behind the pivot axis at the base, the initial disturbance can create a pitch moment in the freewing 110, 115 such that the resulting angle changes can oppose the initial disturbance, and the aircraft can be substantially stable in that mode.

It is to be noted that the torsionally-disconnected freewings can have their principal axes aligned such that the spanwise axis is aft of the pivot axis at the tip, and ahead of the pivot axis at the root. In such a configuration, however, the roll acceleration can cause a moment about the pivot axis that can cause the wing to change its angle relative to the body. Such an angle change may be in a direction that causes the freewing to make a rolling moment that could add to the initial disturbance.

Figure 3:
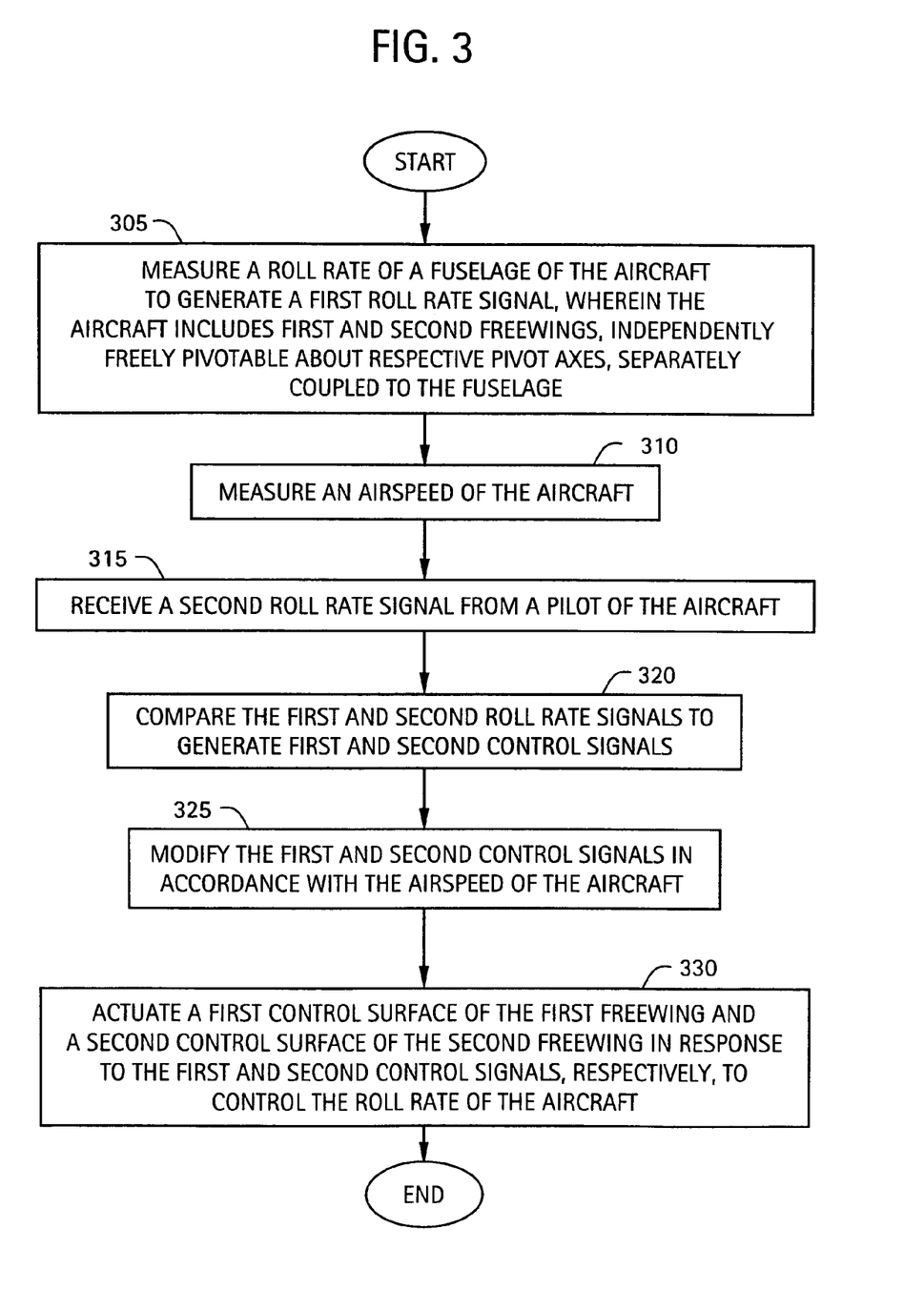
FIG. 3 is a flowchart illustrating steps for controlling the roll rate of an aircraft, in accordance with an exemplary embodiment of the present invention.

FIG. 3 is a flowchart illustrating steps for controlling the roll rate of an aircraft, in accordance with an exemplary embodiment of the present invention. In step 305, the roll rate of the fuselage of the aircraft is measured to generate a first roll rate signal. For example, the roll rate of the fuselage of the aircraft can be measured along a fore-aft axis of the fuselage. The aircraft includes first and second freewings, independently freely pivotable about respective pivot axes, separately coupled to the fuselage. In step 310, the airspeed of the aircraft is measured. In step 315, a second roll rate signal is received from the pilot of the aircraft. In step 320, the first and second roll rate signals are compared to generate first and second control signals (e.g., by taking the difference between the first and second roll rate signals). In step 325, the first and second control signals are modified in accordance with the measured airspeed of the aircraft (e.g., decreased for high airspeeds, and increased for low airspeeds). In step 330, a first control surface of the first freewing and a second control surface of the second freewing are actuated or otherwise deflected in response to the first and second control signals, respectively, to control the roll rate of the aircraft.

The steps of a computer program as illustrated in FIG. 3 for controlling the roll rate of an aircraft can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in any suitable type of aircraft, such as, for example, a ducted fan VTOL aircraft or the like, that use torsionally-disconnected freewings. For example, the torsionally-disconnected freewing system according to exemplary embodiments can be used in such aircraft to provide additional stability with respect to gusts that would produce a rolling motion in conventional freewing aircraft, providing an improved ride and additional stability for, for example, instruments on the aircraft.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. An aircraft, comprising:
a fuselage;
a first main freewing and a second main freewing,
wherein each of the first and second main freewings is torsionally disconnected from each other, such that each of the first and second main freewings is decoupled from each other and the fuselage wherein each of the first and second main freewings is independently and freely pivotable
i) about its respective pivot axis,
ii) about the fuselage, and
iii) in regard to each other, and
wherein each of the first and second main freewings comprises a principal inertial axis, a tip and a base, and
wherein the principal inertial axis of each of the first and second main freewings is substantially aligned fore of the respective pivot axis at the tip of each of the first and second main freewings, and substantially aligned aft of the respective pivot axis at the base of each of the first and second main freewings;
an angular rate sensor,
wherein the angular rate sensor is configured to measure a roll rate of the fuselage and to output a first roll rate signal;
a controller in communication with the angular rate sensor,
wherein the controller is configured to receive a second roll rate signal from a pilot of the aircraft, and
wherein the controller is configured to compare the first and second roll rate signals to generate first and second control surface control signals; and
at least one control actuator in communication with the controller,
wherein the at least one control actuator is configured to actuate a first control surface of the first main freewing and a second control surface of the second main freewing in response to the first and second control surface control signals, respectively, to control a roll rate of the aircraft.

2. The aircraft of claim 1, wherein the angular rate sensor comprises an angular rate gyroscope.

3. The aircraft of claim 1, wherein each of the first and second control surfaces comprises an airfoil on a respective trailing edge of each of the first and second main freewings.

4. The aircraft of claim 1, comprising:
an airspeed sensor in communication with the controller,
wherein the airspeed sensor is configured to measure an airspeed of the aircraft, and
wherein the controller is configured to modify the first and second control surface control signals in accordance with the airspeed of the aircraft.

5. The aircraft of claim 1, wherein the respective pivot axes of the first and second main freewings comprise lateral axes of the fuselage.

6. A system for controlling a roll rate, comprising:
an aircraft;
a roll rate sensor configured to measure a roll rate of a fuselage of the aircraft and to output a first roll rate signal,
wherein the aircraft includes first and second main freewings, torsionally disconnected from each other, such that each of the first and second main freewings is decoupled from each other and the fuselage wherein each of the first and second main freewings is independently and freely pivotable
i) about its respective pivot axis,
ii) about the fuselage, and
iii) in regard to each other, and wherein each of the first and second main freewings comprises a principal inertial axis, a tip and a base, and
wherein the principal inertial axis of each of the first and second main freewings is substantially aligned fore of a respective pivot axis at the tip of each of the first and second main freewings, and substantially aligned aft of the respective pivot axis at the base of each of the first and second main freewings;

a control processor in communication with the roll rate sensor,
wherein the control processor is configured to receive a second roll rate signal from a pilot of the aircraft, and
wherein the control processor is configured to compare the first and second roll rate signals to generate first and second control signals; and
a control actuator in communication with the control processor,
wherein the control actuator is configured to actuate a first control member of the first main freewing and a second control member of the second main freewing in response to the first and second control signals, respectively, to control the roll rate of the aircraft.

7. The system of claim 6, wherein the roll rate sensor comprises an angular rate gyroscope.

8. The system of claim 6, wherein each of the first and second control members comprises an airfoil on a respective trailing edge of each of the first and second main freewings.

9. The system of claim 6, comprising:
a dynamic pressure sensor in communication with the control processor,
wherein the dynamic pressure sensor is configured to measure an airspeed of the aircraft, and
wherein the control processor is configured to modify the first and second control signals in accordance with the airspeed of the aircraft.

10. The system of claim 6, wherein the respective pivot axes of the first and second main freewings comprise lateral axes of the fuselage.

11. A method of controlling a roll rate of an aircraft, comprising the steps of:
a.) measuring a roll rate of a fuselage of the aircraft to generate a first roll rate signal,
wherein the aircraft includes first and second main freewings, torsionally disconnected from each other, such that each of the first and second main freewings is decoupled from each other and the fuselage wherein each of the first and second main freewings is independently and freely pivotable
i) about its respective pivot axis,
ii) about the fuselage, and
iii) in regard to each other, and
wherein each of the first and second main freewings includes a principal inertial axis, a tip and a base, and
wherein the principal inertial axis of each of the first and second main freewings is substantially aligned fore of a respective pivot axis at the tip of each of the first and second main freewings, and substantially aligned aft of the respective pivot axis at the base of each of the first and second main freewings;
b.) receiving a second roll rate signal from a pilot of the aircraft;
c.) comparing the first and second roll rate signals to generate first and second control signals; and
d.) actuating a first control surface of the first main freewing and a second control surface of the second main freewing in response to the first and second control signals, respectively, to control the roll rate of the aircraft.

12. The method of claim 11, wherein each of the first and second control surfaces includes an airfoil on a respective trailing edge of each of the first and second main freewings.

13. The method of claim 11, wherein step (a) is performed along a fore-aft axis of the fuselage.

14. The method of claim 11, comprising the steps of:
e.) measuring an airspeed of the aircraft; and
f.) modifying the first and second control signals in accordance with the airspeed of the aircraft.

15. The method of claim 11, wherein the respective pivot axes of the first and second main freewings comprise lateral axes of the fuselage.

* * * * *